US011100583B2

(12) United States Patent
Borts

(10) Patent No.: US 11,100,583 B2
(45) Date of Patent: *Aug. 24, 2021

(54) SYSTEM AND METHOD FOR CHART BASED ORDER ENTRY

(71) Applicant: TRADING TECHNOLOGIES INTERNATIONAL INC., Chicago, IL (US)

(72) Inventor: Eric Borts, Broomfield, CO (US)

(73) Assignee: Trading Technologies International, Inc., Chicago, IL (US)

(*) Notice: Subject to any disclaimer, the term of this patent is extended or adjusted under 35 U.S.C. 154(b) by 29 days.

This patent is subject to a terminal disclaimer.

(21) Appl. No.: 16/448,857

(22) Filed: Jun. 21, 2019

(65) Prior Publication Data

US 2019/0311434 A1 Oct. 10, 2019

Related U.S. Application Data

(63) Continuation of application No. 15/477,852, filed on Apr. 3, 2017, now Pat. No. 10,373,252, which is a continuation of application No. 14/084,782, filed on Nov. 20, 2013, now Pat. No. 9,646,344, which is a continuation of application No. 13/218,162, filed on (Continued)

(51) Int. Cl.
*G06Q 40/04* (2012.01)
*G06Q 40/00* (2012.01)
*G06Q 40/06* (2012.01)

(52) U.S. Cl.
CPC .............. *G06Q 40/04* (2013.01); *G06Q 40/00* (2013.01); *G06Q 40/06* (2013.01)

(58) Field of Classification Search
CPC ......... G06Q 40/04; G06Q 40/00; G06Q 40/06
See application file for complete search history.

(56) References Cited

U.S. PATENT DOCUMENTS

| 4,896,291 A | 1/1990 | Gest et al. |
| 5,581,670 A | 12/1996 | Bier et al. |
| (Continued) | | |

FOREIGN PATENT DOCUMENTS

| EP | 1262893 A2 | 12/2002 |
| EP | 1262893 A3 | 1/2005 |

OTHER PUBLICATIONS

Kirk Kandt et al, "A Financial Investment Assistant," 1998, Teknowledge Federal Systems, pp. 510-517 (Year: 1998).*

(Continued)

*Primary Examiner* — Kenneth Bartley

(57) ABSTRACT

Systems and methods for chart-based order entry are described. According to one example method a chart is used to display historical market data corresponding to a tradeable object. An order entry interface is displayed in relation to the chart. The order entry interface includes a plurality of price objects for selecting price levels to be used for trade orders to buy or sell the tradeable object. According to one example method, the price levels corresponding to the price objects depend on a location of the interface in relation to the chart, and as the interface is moved in relation to the chart, the price levels are automatically updated. Upon selection of the price level on the interface, a trade order to buy or sell is submitted to a matching engine at an electronic exchange.

20 Claims, 8 Drawing Sheets

Related U.S. Application Data

Aug. 25, 2011, now Pat. No. 8,620,794, which is a continuation of application No. 12/546,451, filed on Aug. 24, 2009, now Pat. No. 8,027,908, which is a continuation of application No. 11/693,219, filed on Mar. 29, 2007, now Pat. No. 7,580,883.

(56) References Cited

U.S. PATENT DOCUMENTS

| | | | |
|---|---|---|---|
| 5,596,699 A | 1/1997 | Driskell | |
| 5,689,667 A | 11/1997 | Kurtenbach | |
| 5,701,424 A | 12/1997 | Atkinson | |
| 5,737,557 A | 4/1998 | Sullivan | |
| 5,745,717 A | 4/1998 | Vayda et al. | |
| 5,754,176 A | 5/1998 | Crawford | |
| 5,757,358 A | 5/1998 | Osga | |
| 5,790,820 A | 8/1998 | Vayda et al. | |
| 5,798,760 A | 8/1998 | Vayda et al. | |
| 5,805,161 A | 9/1998 | Tiphane | |
| 5,880,723 A | 3/1999 | Driskell | |
| 5,933,138 A | 8/1999 | Driskell | |
| 6,002,402 A | 12/1999 | Schacher | |
| 6,012,046 A | 1/2000 | Lupien et al. | |
| 6,018,722 A | 1/2000 | Ray et al. | |
| 6,064,984 A | 5/2000 | Ferguson et al. | |
| 6,118,427 A | 9/2000 | Buxton et al. | |
| 6,219,053 B1 | 4/2001 | Tachibana et al. | |
| 6,285,367 B1 | 9/2001 | Abrams et al. | |
| 6,408,282 B1 | 6/2002 | Buist | |
| 6,414,700 B1 | 7/2002 | Kurtenbach et al. | |
| 6,549,219 B2 | 4/2003 | Selker | |
| 6,709,330 B1 | 3/2004 | Klein et al. | |
| 6,766,304 B2 | 7/2004 | Kemp, II et al. | |
| 6,772,132 B1 | 8/2004 | Kemp, II et al. | |
| 6,883,143 B2 | 4/2005 | Driskell | |
| 6,915,492 B2 | 7/2005 | Kurtenbach et al. | |
| 6,918,091 B2 | 7/2005 | Leavitt et al. | |
| 6,938,011 B1 | 8/2005 | Kemp, II et al. | |
| 6,993,504 B1 | 1/2006 | Friesen et al. | |
| 7,046,248 B1 | 5/2006 | Perttunen | |
| 7,099,836 B2 | 8/2006 | Cichanowicz | |
| 7,113,190 B2 | 9/2006 | Heaton | |
| 7,127,424 B2 | 10/2006 | Kemp, II et al. | |
| 7,210,107 B2 | 4/2007 | Wecker et al. | |
| 7,212,999 B2 | 5/2007 | Freisen et al. | |
| 7,228,289 B2 | 6/2007 | Brumfield et al. | |
| 7,287,232 B2 | 10/2007 | Tsuchimura et al. | |
| 7,302,384 B2 | 11/2007 | Moore | |
| 7,389,268 B1 | 6/2008 | Kemp, II et al. | |
| 7,412,416 B2 | 8/2008 | Freisen et al. | |
| 7,546,550 B1 | 6/2009 | Buck | |
| 7,559,036 B1 | 7/2009 | Buck | |
| 7,562,047 B2 | 7/2009 | Freisen et al. | |
| 7,580,881 B2 | 8/2009 | Singer et al. | |
| 7,580,883 B2 | 8/2009 | Borts | |
| 7,610,237 B1 | 10/2009 | Strauss et al. | |
| 7,711,631 B2 | 5/2010 | Singer et al. | |
| 7,835,972 B2 | 11/2010 | Almeida et al. | |
| 7,933,828 B2 | 4/2011 | Bandman et al. | |
| 8,027,908 B2 | 9/2011 | Borts | |
| 8,037,422 B1 | 10/2011 | Buck | |
| 8,131,626 B2 | 3/2012 | Langridge | |
| 8,620,794 B2 | 12/2013 | Borts | |
| 8,713,478 B2 | 4/2014 | Buck | |
| 9,646,344 B2 | 5/2017 | Borts | |
| 10,037,125 B2 | 7/2018 | Buck | |
| 2002/0026404 A1 | 2/2002 | Thompson | |
| 2002/0120551 A1 | 8/2002 | Jones | |
| 2002/0122072 A1 | 9/2002 | Selker | |
| 2002/0161690 A1 | 10/2002 | McCarthy et al. | |
| 2002/0178104 A1 | 11/2002 | Hausman | |
| 2003/0004852 A1 | 1/2003 | Burns | |
| 2003/0004853 A1 | 1/2003 | Ram et al. | |
| 2003/0110120 A1 | 6/2003 | Salehi | |
| 2003/0131315 A1 | 7/2003 | Escher | |
| 2004/0019551 A1 | 1/2004 | Martyn et al. | |
| 2004/0193524 A1 | 9/2004 | Almeida et al. | |
| 2005/0004852 A1 | 1/2005 | Whitney | |
| 2005/0027509 A1 | 2/2005 | Moore | |
| 2005/0044031 A1 | 2/2005 | Lebedev | |
| 2005/0060256 A1 | 3/2005 | Peterson et al. | |
| 2005/0080710 A1 | 4/2005 | Malato | |
| 2005/0144113 A1 | 6/2005 | Opperman et al. | |
| 2006/0010066 A1 | 1/2006 | Rosenthal et al. | |
| 2006/0059083 A1 | 3/2006 | Friesen et al. | |
| 2006/0069635 A1 | 3/2006 | Ram et al. | |
| 2006/0161495 A1 | 7/2006 | Wigzell | |
| 2006/0235786 A1 | 10/2006 | DiSalvo | |
| 2006/0253371 A1 | 11/2006 | Rutt et al. | |
| 2007/0005477 A1 | 1/2007 | McAtamney | |
| 2007/0005481 A1 | 1/2007 | Kedia et al. | |
| 2007/0027788 A1 | 2/2007 | Bandman et al. | |
| 2007/0118452 A1 | 5/2007 | Mather et al. | |
| 2007/0156565 A1 | 7/2007 | Singer et al. | |
| 2007/0156570 A1 | 7/2007 | Singer et al. | |
| 2007/0240053 A1 | 10/2007 | Lutnick et al. | |
| 2007/0265954 A1 | 11/2007 | Mather et al. | |
| 2007/0271171 A1 | 11/2007 | Lutnick et al. | |
| 2008/0021806 A1 | 1/2008 | Townsend et al. | |
| 2008/0115079 A1 | 5/2008 | Mather | |
| 2008/0243710 A1 | 10/2008 | Borts | |
| 2009/0319950 A1 | 12/2009 | Borts | |
| 2011/0307371 A1 | 12/2011 | Borts | |
| 2011/0320337 A1 | 12/2011 | Buck | |
| 2014/0195411 A1 | 7/2014 | Buck | |
| 2014/0229359 A1 | 8/2014 | Borts | |
| 2017/0206605 A1 | 7/2017 | Borts | |
| 2018/0321800 A1 | 11/2018 | Buck | |

OTHER PUBLICATIONS

Accot, J. and Zhai, S., "Beyond Fitts' Law: Models for Trajectory-based HCI tasks," *Proceedings of the CHI' 1997 Conference on Human Factors in Computing Systems*, Mar. 22-27, 1997, New York: ACM, pp. 295-302.

Accot, J. and Zhai, S., "Refining Fitts Law Models for Bivariate Pointing," *Proceedings of the CHI' 2003 Conference of Human Factors in Computing Systems*, Apr. 5-10, 2003, New York: ACM, pp. 1-8.

Christie, J., et al., "A Comparison of Simple Hierarchical and Grid Metaphors for Option Layouts on Small-Size Screens," *International Journal of Human Computer Studies*, 2004, vol. 60, pp. 1-29.

Fitts, P. M., "The Information Capacity of the Human Motor System in Controlling the Amplitude of Movement," *Journal of Experimental Psychology*, 1954, vol. 47, pp. 381-391 (Reprint *Journal of Experimental Psychology*, 1992, vol. 121, No. 3, pp. 262-269).

International Search Report and Written Opinion of International Application No. PCT/US2008/058376, dated Mar. 27, 2008.

Konarev, Petr V., Volkov, Vladimir V., Soklova, Anna V., Koch, Michel H. J. and Svergun, Dmitri I. ; Journal of Applied Crystallography; "Primus: a Windows PC-based system for small-angle scattering data analysis"; 2003; pp. 1-6.

Kurtenbach, et al., "The Hotbox: Efficient Access to a Large Number of Menu-items," *Proceedings of the CHI' 1999 Conference of Human Factors in Computing Systems*, May 15-20, 1999, New York: ACM, pp. 231-237.

MacKenzie, I.S. and Buxton, W., "Extending Fitts' Law to Two-Dimensional Tasks," *Proceedings of the CHI' 1992 Conference of Human Factors in Computing Systems*, May 3-7, 1992, New York: ACM, pp. 219-226.

MacKenzie, I.S. and Buxton, W., "The Prediction of Pointing and Dragging Times in Graphical User Interfaces," *Interacting with Computers*, 1994, vol. 6, pp. 213-227.

MacKenzie, I.S., "A Note on the Information-theoretical Basis for Fitts' Law," *Journal of Motor Behavior*, 1989, vol. 21, pp. 323-330.

MacKenzie, I.S., "Fitts' Law as a Performance Model in Human-Computer Interaction," Doctoral Dissertation, University of Toronto: Toronto, Ontario, Canada, 1991, pp. 1-140.

(56) References Cited

OTHER PUBLICATIONS

MacKenzie, I.S., "Movement Time Prediction in Human-Computer Interfaces," in R.M. Baecker, et al. (Eds.), *Readings in Human-Computer Interaction* (2$^{nd}$ Ed.), *Kaufmann: Los Altos, CA, 1992, pp. 1-19.*

Meyer, D.E., et al., "Optimality in Human Motor Performance: Ideal Control of Rapid Aimed Movements," *Psychological Review,* 1988, vol. 95, No. 3, pp. 340-370.

Oel, et al., "Time Prediction of Mouse-based Cursor Movements," *Proceedings of Joint AFIHM-BCS Conference on Human-Computer Interaction IHM-HCI'2001.* Lille, France: Sep. 10-14, 2001, vol. II, pp. 37-40.

Schmitt, A. and Oel, P., "Calculation of Totally Optimized Button Configurations Using Fitts' Law," in *Proceedings of the HCI International '99 Conference on Human-Computer Interaction,* Munich, Germany, Aug. 22-26, 1999. vol. 1, pp. 392-396.

Sears, A., "Layout Appropriateness: A Metric for Evaluating User Interface Widget Layout," *IEEE Transactions on Software Engineering,* 1993, vol. 19, No. 7, pp. 707-719.

The Technical Analyst, "Trading Technologies' X_Trader 7", Jul./Aug. 2006, pp. 41-43.

Tognazzini, B. "A Quiz Designed to Give You Fitts," [online], AskTog Website, Feb. 2009. [Retrieved on Mar. 23, 2011] from the Internet: http://www.asktog.com/columns/022DesignedToGiveFitts.html.

Tognazzini, B. "AskTog Reader Mail," [online], AskTog Website, May 2009. [Retrieved on Mar. 23, 2011] from the Internet: http://www.asktog.com/readerMail/1999-05ReaderMail.html.

Whisenand, T.G. and Emurian, H.H., "Some Effects of Angle of Approach on Icon Selection," *CHI' Companion 1995,* Mosaic of Creativity, May 7-11, 1995, pp. 298-299.

"Object-tree Within a Pie Menu," Research Disclosure 315,041, disclosed anonymously, published in Jul. 1990 by Kenneth Mason Publications, Ltd.

\* cited by examiner

SYSTEM AND METHOD FOR CHART BASED ORDER ENTRY

CROSS REFERENCE TO RELATED APPLICATIONS

The present application is a continuation of U.S. patent application Ser. No. 15/477,852 filed Apr. 2, 2017, now U.S. Pat. No. 10,373,252, which is a continuation of U.S. patent application Ser. No. 14/084,782 filed Nov. 20, 2013, now U.S. Pat. No. 9,646,344, which is a continuation of U.S. patent application Ser. No. 13/218,162 filed Aug. 25, 2011, now U.S. Pat. No. 8,620,794, which is a continuation of U.S. patent application Ser. No. 12/546,451 filed Aug. 24, 2009, now U.S. Pat. No. 8,027,908, which is a continuation of U.S. patent application Ser. No. 11/693,219 filed Mar. 29, 2007, now U.S. Pat. No. 7,580,883, the contents of all of which are fully incorporated herein by reference for all purposes.

TECHNICAL FIELD

The present invention is directed towards electronic trading. More specifically, the present invention is directed to tools for chart-based order entry in an electronic trading environment.

BACKGROUND

Electronic trading is generally based on a host exchange, one or more computer networks, and client devices. Subscribing traders are connected to an exchange's electronic trading platform by way of communication links and through an application program interface to facilitate real-time electronic messaging between themselves and the exchanges. The electronic trading platform includes at least one electronic market, which is at the center of the trading system and handles the matching of bids and offers placed by the traders for that market. The electronic messaging includes market information that is distributed from the electronic market to the traders via an electronic data feed. Once the traders receive the market information, it may be displayed to them on their trading screens. Upon viewing the information, traders can take certain actions including the actions of sending buy or sell orders to the electronic market, adjusting existing orders, deleting orders, or otherwise managing orders. Traders may also use software tools on their client devices to automate these and additional actions.

Although the types of market information published by an electronic exchange may differ from market to market, there are generally some standard pieces of information. Market information may include data that represents just the inside market. The inside market is the lowest available ask price (best ask) and the highest available bid price (best bid) in the market for a particular tradeable object at a particular point in time. Market information may also include market depth. Market depth refers to quantities available at the inside market and may also refer to quantities available at other prices away from the inside market. The quantity available at a given price level is usually provided by the exchange in aggregate sums. In other words, an exchange usually provides the total buy quantity and the total sell quantity available in the market at a particular price level in its data feed. In addition to providing order book information, such as price and quantity information, electronic exchanges can offer other types of market information such as the open price, settlement price, net change, volume, last traded price, the last traded quantity, and order fill information.

The extent of market depth available for a trader usually depends on the exchange. For instance, some exchanges provide market depth for all (or most) price levels, and others may provide no market depth at all. Electronic exchanges may also limit the market depth offered as market information can become intensive for network and client devices to process. For instance, an electronic market might offer only five levels of market depth, which includes the quantities available at the current top five buy prices and the quantities available at the current top five sell prices.

To profit in electronic markets, market participants must be able to assimilate large amounts of data to recognize market trends and to view current market conditions. Traders often use charts to analyze and predict market movements. Many traders enter trade orders to buy or sell a tradeable object via a chart. There are existing order entry systems that allow a trader to select a desired price level for a trade order on the chart. However, the existing chart order entry methods suffer from accuracy problems as one pixel on the chart may represent a single or multiple price levels, accurately selecting a desired price level may be impossible due to the human error and limitations of currently available user input devices. Thus, it is desirable to provide a fast and more accurate order entry on a chart.

BRIEF DESCRIPTION OF THE FIGURES

Example embodiments are described herein with reference to the following drawings, in which.

SUMMARY

An example system and methods for chart based order entry are provided. According to one example method, historical market data corresponding to a tradeable object is displayed via a chart, with the historical market data being updated as new market data corresponding to the tradeable object is received from an electronic exchange so that the chart displays the historical market data as well as the current market data. An order entry interface is also displayed in relation to the chart. The order entry interface includes a plurality of price objects corresponding to a plurality of price levels. According to the example embodiment, the plurality of price levels that correspond to price objects are set based on a location of the order entry interface in relation to the chart. As a user moves the order entry interface in relation to the chart, the price levels also change to correspond to a new set of prices. For example, upon activating the order entry interface, a cursor corresponding to a user input device may be displayed at the center of the order entry interface, and the location of the cursor may determine the price levels associated with the price objects. According to one example embodiment, the order entry interface is divided into a bid side and an ask side having price objects corresponding to the same set of prices. When a user wishes to send a trade order for the tradeable object, the user may select a desired price either on the buy side or the ask side to effectively send a buy trade order or a sell trade order to a matching engine at an electronic exchange.

Other features of the present invention will become more apparent to persons having ordinary skill in the art to which the present invention pertains from the following description and claims.

DETAILED DESCRIPTION

I. A First Example Trading System

Figure 1:
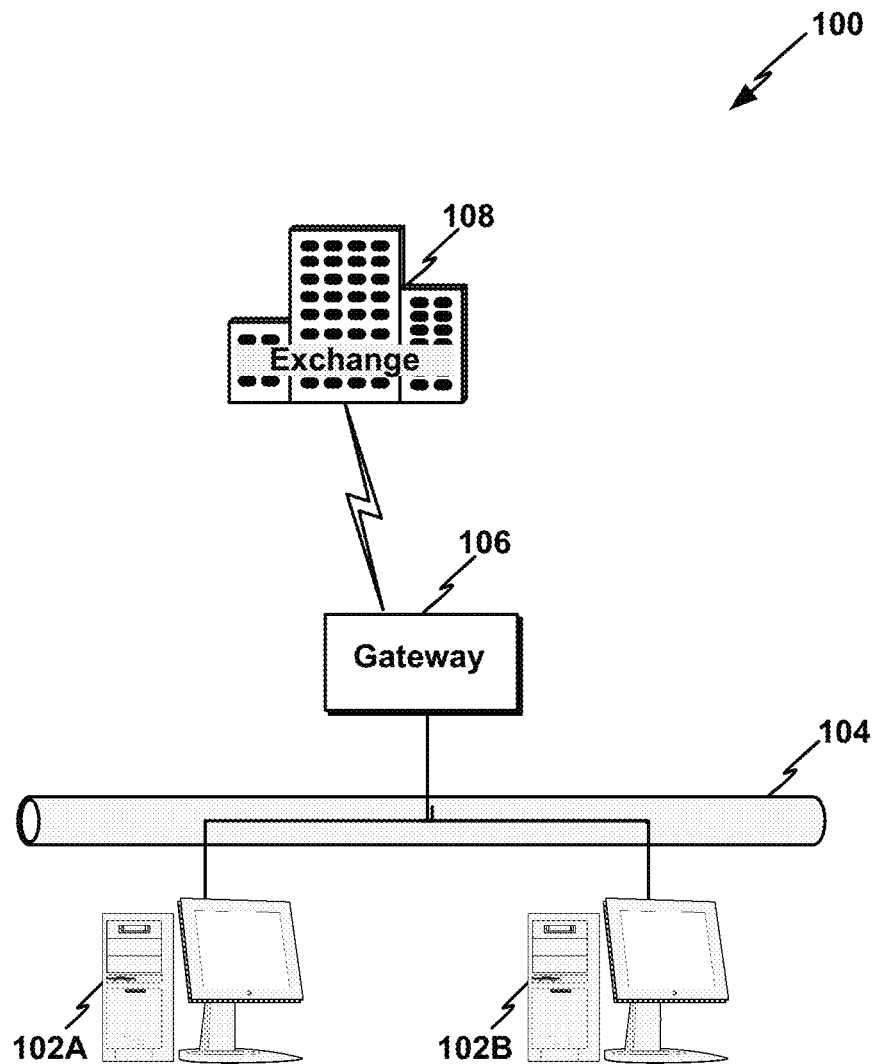
FIG. 1 illustrates an example electronic trading system in which a client terminal and a gateway are located on a local area network.

FIG. 1 illustrates an example electronic trading system 100 in which the example embodiments may be employed. The example system 100 comprises trading stations 102A and 102B that access an electronic exchange 108 through a gateway 106. As illustrated in FIG. 1, the trading stations 102A-B and the gateway 106 are located within a local LAN 104. While not shown, a router could be used to route messages between the gateway 106 and the electronic exchange 108. The electronic exchange 108 includes a computer process (e.g., the central computer) that matches buy and sell orders sent from the trading stations 102A-B with orders from other trading stations (not shown). The electronic exchange 108 lists one or more tradeable objects for trading. While not shown in FIG. 1 for the sake of clarity, the trading system may include other devices that are specific to the client site like middleware and security measures like firewalls, hubs, security managers, and so on, as understood by persons skilled in the art.

Regardless of the types of order execution algorithms used, the electronic exchange 108 provides market information to the subscribing trading stations 102A-B. Market information may include data that represents just the inside market. The inside market is the lowest sell price (best ask) and the highest buy price (best bid) at a particular point in time. Market information may also include market depth. Additionally, the exchange 108 can offer other types of market information such as the last traded price (LTP), the last traded quantity (LTQ), and order fill information.

The computer employed as the trading stations 102A-B generally can range from a hand-held device, laptop, or personal computer to a larger computer such as a workstation and multiprocessor. An illustrative personal computer may use Pentium™ microprocessors and may operate under a Windows operating system, or yet may use some other microprocessor or operating system. Generally, each of the trading stations 102A-B includes a monitor (or any other output device) and one or more input devices, such as a keyboard and/or a two or three-button mouse to support click based trading, if so desired. One skilled in the art of computer systems will understand that the present example embodiments are not limited to any particular class or model of computer employed for the trading stations 102A-B and will be able to select an appropriate system.

In one example embodiment, the trading stations 102A-B use software to create specialized interactive trading screens on terminals associated with them. Trading screens preferably enable traders to, among other things, enter and execute orders, obtain market quotes, and monitor positions. The range and quality of features available to the trader on his or her trading screen may vary according to the specific software application being run. In addition to or in place of the interactive trading screens, a trading station could run automated types of trading applications.

One type of trading screen that if often used at trading stations is provided by a commercially available trading application referred to as X_TRADER® from Trading Technologies International, Inc. of Chicago, Ill. X_TRADER® also provides an electronic trading interface, referred to as MD Trader™, in which working orders and/or bid and ask quantities are displayed in association with a static price axis or scale.

Portions of the X_TRADER® and the MD Trader™-style display are described in U.S. Pat. No. 6,772,132, entitled "Click Based Trading With Intuitive Grid Display of Market Depth," filed on Jun. 9, 2000; U.S. Pat. No. 6,938,011, entitled "Click Based Trading with Market Depth Display" filed on Jun. 9, 2000; U.S. Pat. No. 7,127,424 entitled "Click Based Trading With Intuitive Grid Display of Market Depth and Price Consolidation," filed on Oct. 5, 2001; U.S. patent application Ser. No. 10/125,894, entitled "Trading Tools For Electronic Trading," filed on Apr. 19, 2002, and U.S. patent application Ser. No. 10/376,417, entitled "A System and Method for Trading and Displaying Market Information in an Electronic Trading Environment," filed on Feb. 28, 2003, the contents of each are incorporated herein by reference. Additionally, the preferred embodiments are not limited to any particular product that performs translation, storage, and display function.

The computer employed as the gateway 106 generally can range from a personal computer to a larger or faster computer. An illustrative gateway computer may use Pentium™ microprocessors and may operate under a Windows (server or workstation) operating system, or yet some other system. Generally, the gateway 106 may additionally include a monitor (or any other output device), input device, and access to a database, if so desired. One skilled in the art of computer systems will also understand that the present example embodiments are not limited to any particular class or model of computer(s) employed for the gateway 106 and will be able to select an appropriate system.

It should be noted that a computer system employed here as a trading station or a gateway generally includes a central processing unit, a memory (a primary and/or secondary memory unit), an input interface for receiving data from a communications network, an input interface for receiving input signals from one or more input devices (for example, a keyboard, mouse, etc.), and an output interface for communications with an output device (for example, a monitor). A system bus or an equivalent system may provide communications between these various elements.

Memory on either the gateway 106 or the trading station 102 may include a computer readable medium. The term computer readable medium, as used herein, refers to any medium that participates in providing instructions to a processor unit for execution. Such a medium may take many forms, including but not limited to, non-volatile media, and transmission media. Non-volatile media include, for example, optical or magnetic disks, such as storage devices. Volatile media include, for example, dynamic memory, such as main memory or random access memory ("RAM").

Common forms of computer readable media include, for example, floppy disks, flexible disks, hard disks, magnetic tape, punch cards, CD-ROM, any other physical medium, memory chip or cartridge, or any other medium from which a computer can read.

It should also be noted that the trading stations 102A-B generally execute application programs resident at the trading stations 102A-B under the control of the operating system of the trading station. Also, the gateway 106 executes application programs resident at the gateway 106 under the control of the operating system of the gateway 106. In other embodiments and as understood by a person skilled in the art, the function of the application programs at the trading stations 102A-B may be performed by the gateway 106, and likewise, the function of the application programs at the gateway 106 may be performed by the trading stations 102A-B.

The actual electronic trading system configurations are numerous, and a person skilled in the art of electronic trading systems would be able to construct a suitable network configuration. For the purposes of illustration, some example configurations are provided to illustrate where the elements may be physically located and how they might be connected to form an electronic trading system. These illustrations are meant to be helpful to the reader, and they are not meant to be limiting. According to one example illustration, the gateway device may be located at the client site along with the trading station, which is usually remote from the matching process at the electronic exchange. Alternatively, no gateway is used at all.

According to the illustrated embodiment, the trading stations 102A-B, the gateway 106, and any routers communicate over the LAN 104, and the gateway 106 may communicate with the matching process at the electronic exchange 108 over a T1, T3, ISDN, or some other high speed connection. In another example illustration, the client site may be located on the actual grounds of the electronic exchange (for example, in the building of the exchange). According to this instance, the trading station and the gateway may still communicate over a LAN, but if any routers are used, they may communicate with the matching process at the electronic exchange through another connection means besides a T1, T3, or ISDN. In yet another example illustration, the gateway may be housed at, or near, its corresponding electronic exchange. According to this instance, the trading station may communicate with the gateway over a wide area network or through the use of a T1, T3, ISDN, or some other high speed connection.

While a single exchange is shown in FIG. 1, it should be understood that a trader may obtain access and trade at multiple electronic exchanges. In such an embodiment, a client terminal could access multiple exchanges through multiple gateways, with each gateway designated for a specific exchange. Alternatively, a single gateway may be programmed to handle more than one electronic exchange.

It could be very valuable to provide a trader with the opportunity to trade tradeable objects listed at different electronic exchanges. For example, a trader could view market information from each tradeable object through one common visual display. As such, price and quantity information from the two separate exchanges may be presented together so that the trader can view both markets simultaneously in the same window. In another example, a trader can spread-trade different tradeable objects listed at the different electronic exchanges.

II. A Second Example Trading System

Figure 2:
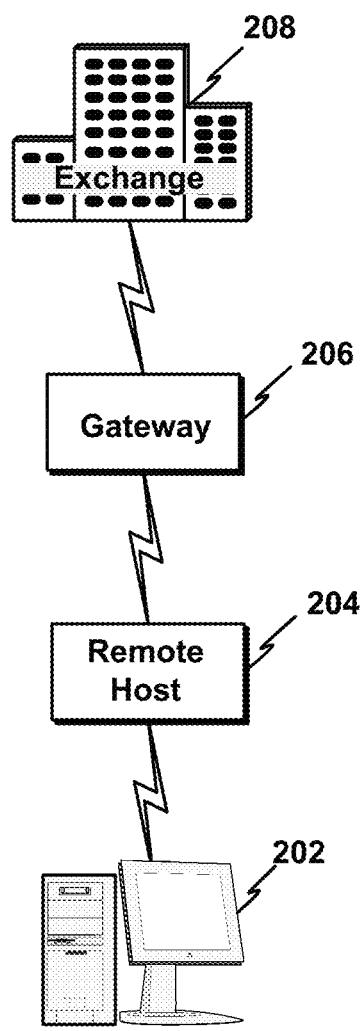
FIG. 2 illustrates an example electronic trading system in which a client terminal is located remote from a gateway.

The second method that is often used to connect network segments in an electronic trading environment is a remote connection. FIG. 2 illustrates an example electronic trading system 200 in which a trading station is located remote from a gateway. The example system 200 comprises a remote trading station 202, a remote host 204, a gateway 206, and an exchange 208. A trader connecting in a remote mode connects to the remote host 204 located at a site that hosts the gateway 206 via the Internet or through a direct connection. Example connections between the remote trading station 202 and the remote host include an ISDN, cable, DSL, or a least line connection. The remote host 204 and the gateway 206 may communicate via a LAN.

In the remote mode of operation, the remote trading station initiates a connection to the remote host 204 by establishing a Transmission Control Protocol ("TCP") session. It should be understood that different protocols could be used as well. When data arrives at the remote host 204 from the gateway 206, the remote host 204 sends it to the client terminal 202 via the established TCP connection.

While two example trading systems have been described above, it should be understood that different network connection are possible as well, and the example embodiments are not limited to the described systems. For example, another example trading system could be configured to use Wide Area Networks (WAN) and WAN routers. One skilled in the art of electronic trading systems will understand that the present embodiments are not limited to the particular configurations illustrated and described with respect to FIGS. 1-2, and will be able to design a particular system based on the specific requirements (for example, by adding additional exchanges, gateways, trading stations, routers, or other computers serving various functions like message handling and security). Additionally, several networks, like either of the networks shown in FIGS. 1-2, may be linked together to access one or more electronic exchanges.

III. Example System Functions

Figure 3:
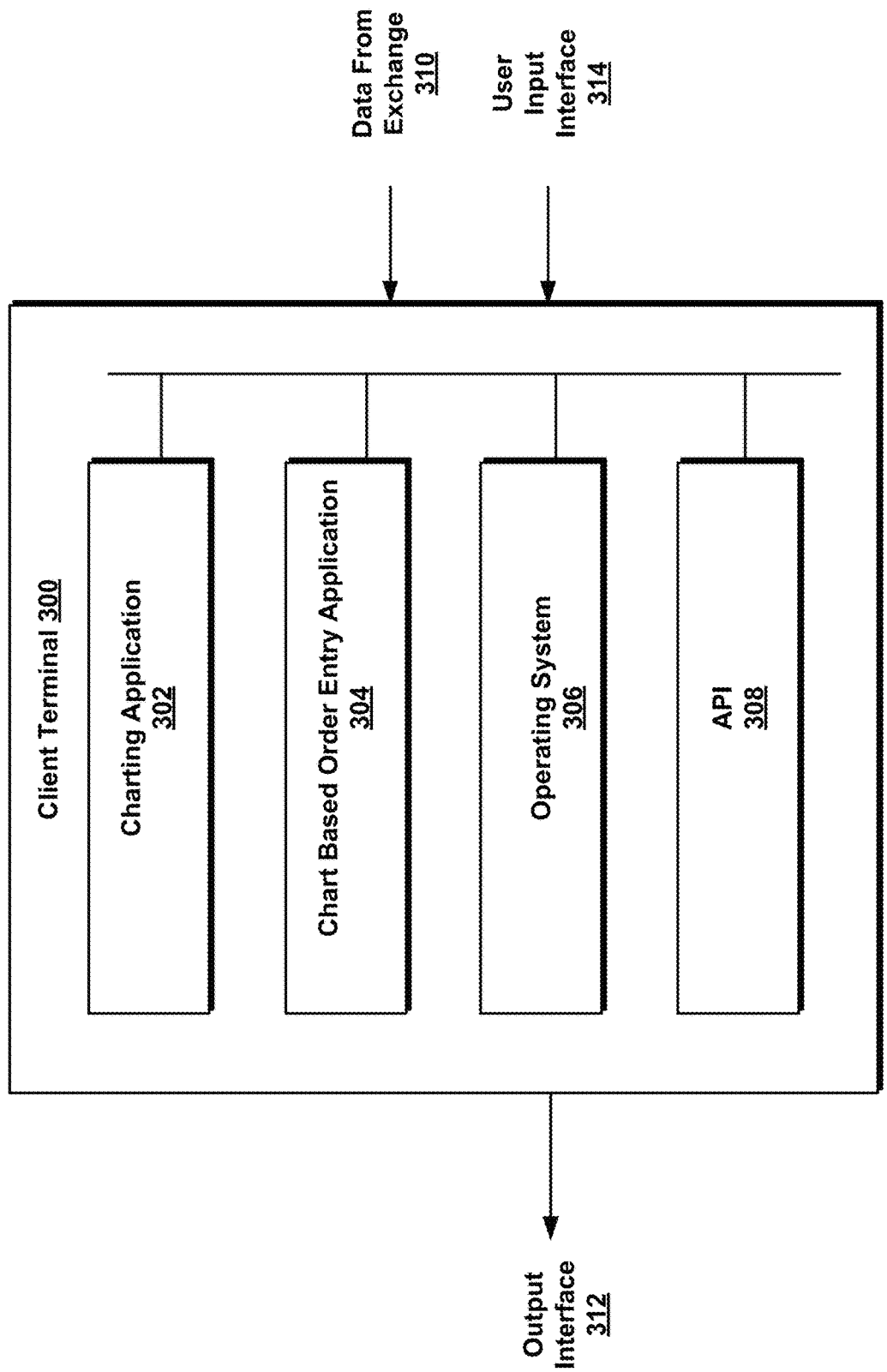
FIG. 3 is a block diagram illustrating a client terminal with a number of layers defining different stages that may be used to implement embodiments of the present invention.

FIG. 3 is a block diagram illustrating a client terminal 300 with a number of layers defining different stages that may be used to implement embodiments of the present invention. The layers include a charting application 302, a chart-based order entry application 304, an operating system 306, and an application programming interface ("API") 308. The client terminal 300 also preferably includes, among other things, at least a processor and memory (both of which are not shown in figure, but are well known computer components). Preferably, the processor has enough processing power to handle and process various types of market information. Therefore, the more market information is received and processed, the more processing power is preferred. However, any present day processor has enough processing power to handle and process various types of market information. Also, it should be understood that memory may include any computer readable medium. The term computer readable medium, as used herein, refers to any medium that participates in providing instructions to a processor unit for execution.

Preferably, the charting application 302 has access to market data from one or more host electronic exchanges through an interface such as the API 308. When the charting application 302 receives market data from the host exchange 310, it arranges and displays the received data on a chart that a trader may view on a visual output display device 312. Example display devices include CRT-based video displays, LCD-based displays, gas plasma-panel displays, displays that show three-dimensional images, different display types, or the combination thereof.

The chart-based order entry application 304 allows for order entry via a chart, as will be explained in greater detail below. In short, the chart-based order entry application 304 generates an order entry interface to be displayed in relation to a chart. According to one example embodiment, the order entry interface takes a format similar to a pie chart interface with a plurality of objects or slices of the pie chart interface dynamically displaying a set of market price levels determined based on the position of the pie chart interface in relation to the chart. As will be described in greater detail below, a user may select one of the prices displayed in relation to the pie chart interface to effectively set a price for a trade order to buy or sell a tradeable object and to send the trade order to an electronic exchange.

The chart-based order entry application 304 interacts with a trading application, such as X_TRADER® referenced above, so that when an order is entered using the chart-based order entry methods, the order may be sent to an electronic exchange by the trading application. It should be understood that, according to one example embodiment, the chart-based order entry application 304 could be an internal module of any trading application. Alternatively, the chart-based order entry interface 304 may be programmed so that there is no need to interact with any trading applications.

The charting application 302 and the chart-based order entry application 304 receive input signals from a trader via input devices 314. Example input devices include a mouse, a keyboard, a game pad, or a stylus in the systems using touch-screen display devices. However, different input devices or a combination of input devices could also be used. For example, input signals received from a user may include an input in relation to a chart to enter a trade order to an electronic exchange, the methods of which will be described below.

The operating system 306 is used to manage hardware and software resources of the client terminal 300. General functions of the operating system 306 include, among others, processor management, memory management, device management, storage management, as well as application interfaces and user interface management. Any type of operating system may be used to implement the present embodiments, and examples of common operating systems include the Microsoft WINDOWS family operating systems, the UNIX family operating systems, or the MACINTOSH operating systems. However, those ordinarily skilled in the art will recognize that the added complexity of an operating system may not be necessary to perform the functions described herein.

IV. Chart-Based Order Entry Examples

Figure 4:
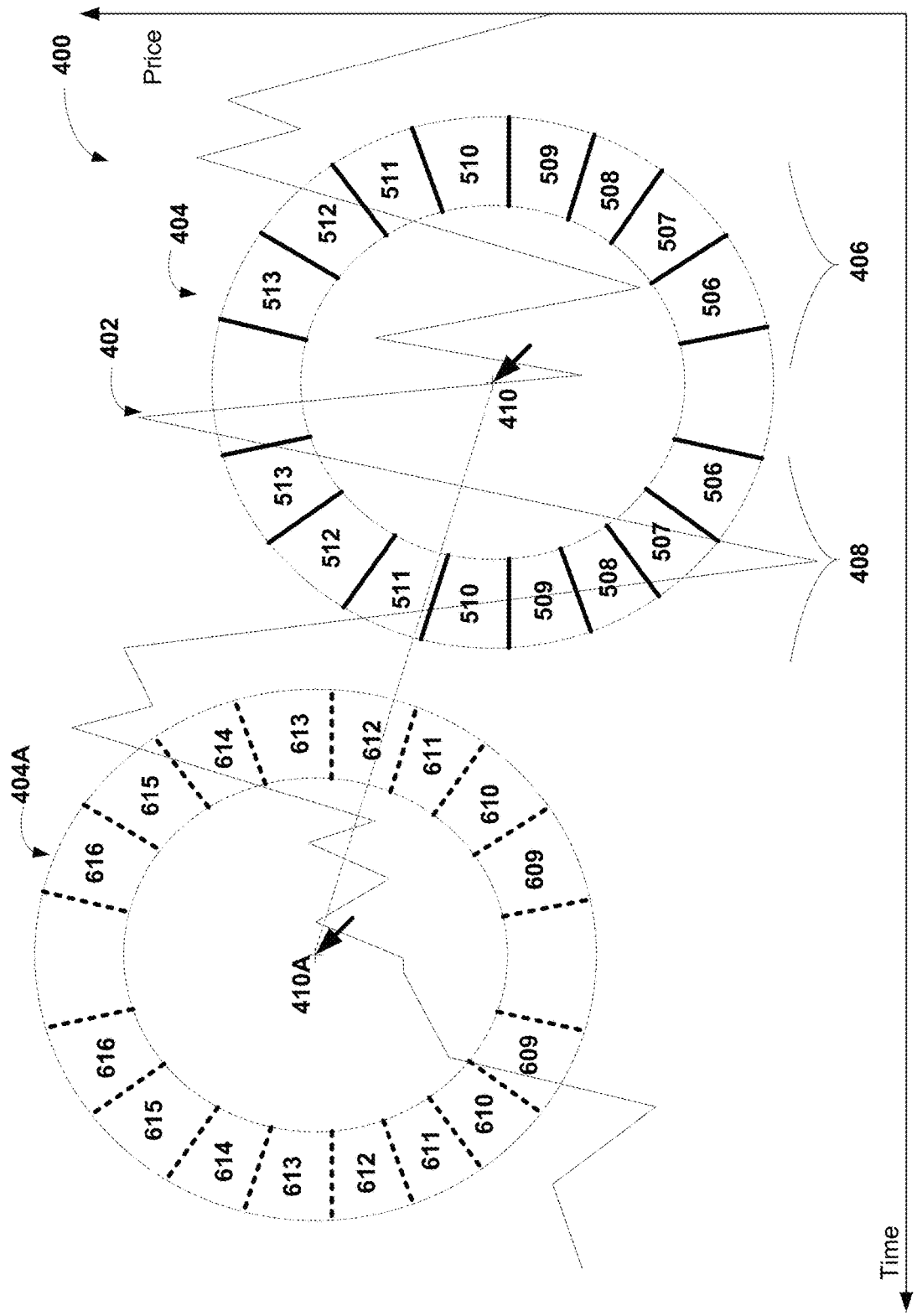
FIG. 4 is a block diagram illustrating one example embodiment of an order entry interface for use in relation to a chart.

FIG. 4 is a block diagram 400 illustrating one example embodiment of an order entry interface for use in relation to a chart. The block diagram 400 includes a chart 402 displayed in relation to a price-based axis and a time-based axis. According to one example embodiment, the chart 402 displays market data corresponding to a tradeable object being traded at an electronic exchange, and units that are used in relation to the price-based axis are based on prices that are used at an electronic exchange to trade the tradeable object. It should be understood that the chart is dynamically updated as new market data is received for the tradeable object from the electronic exchange so that the chart displays historical market data as well as current market data. It should be understood that many different market related parameters could be displayed via the chart 402, including the last traded price, the best bid price, the best ask price, or others.

The diagram 400 also illustrates an order entry interface 404 displayed in relation to the chart 402. The order entry interface 404 illustrated in FIG. 4 takes a format of a wedge or pie-chart like interface having a plurality of selectable price-based objects that are divided into a first set 406 corresponding to a first half of the interface 404 and a second set 408 corresponding to a second half of the interface 404. According to the illustrated example embodiment, the interface objects shown at 406 and 408 display an expanded view of price levels that are determined based on a location of the order entry interface 404 in relation to the chart 402. More specifically, the first and second portions 406 and 408 display an identical set of a plurality of price levels, with the left half 408 of the interface 404 representing bid prices and the right half 406 representing ask prices. It should be understood that a reverse configuration could be used as well, and the displayed price levels could be color-coded based on the user's preferences. For example, blue could be used to color-code bid prices, and red could be used to color-code ask prices. However, different colors and configurations could be used as well. Additionally, while a ring-like or pie-like structure is illustrated in relation to the interface 404, it should be understood that many different shapes could be used as well such as any arc-shaped interfaces or an interface having the price objects positioned in relation to vertical or horizontal columns. Many different interfaces using different curvature angles are possible as well.

Price levels displayed at 406 and 408 dynamically change based on a location of the interface 404 in relation to the chart 402. According to one example embodiment, a cursor may be displayed at a center point of the order entry interface, such as shown at 406, and as the cursor is moved along the chart, the position of the cursor at some point directly on the chart 402 or off the chart 402 determines a set of prices that are displayed via the interface 404. In the example embodiment of FIG. 4, the interface 404 displays eight price levels in each half of the interface 404. In such an embodiment, one of the objects close to the center of each half of the interface 402 may be used as a reference price object that corresponds to a price level that maps to a position of a cursor at 410 in relation to the chart 402.

According to the example embodiment shown in FIG. 4, the price object that displays a price level of 510 is a reference price object, and the three upper objects display three higher price levels, and the four lower objects display four lower price levels. It should be understood that any price object could be configured to be a reference price object and represent a price levels that corresponds to a location of the cursor in relation to the chart. Additionally, price levels displayed in relation to the reference price object could be displayed in the reverse order, with the prices lower than a price at the reference price object being displayed in relation to the top price objects, and prices higher than the price of the reference price object being displayed in the lower price objects, such as illustrated in relation to an order entry interface 500 shown in FIG. 5. Also, while the prices displayed in relation to the reference price object use a single increment price value, different configurations using different increment values are possible as well.

It should be understood that different configurations of the interface 404 are possible as well, with any other price object than the center object of the interface 404 corresponding to the price that matches the position of the cursor 410.

Figure 5:
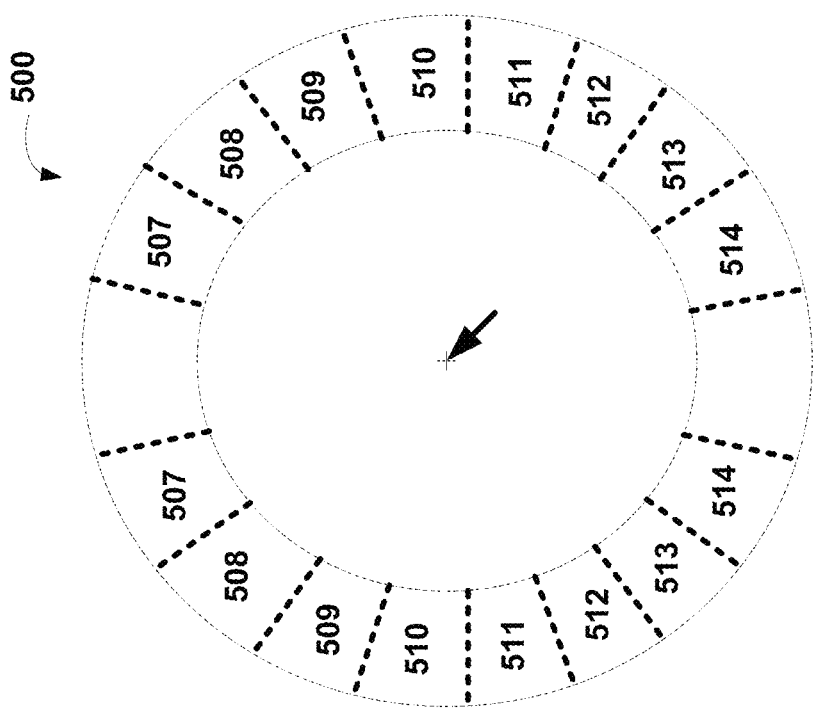
FIG. 5 is a block diagram illustrating another configuration of an order entry interface for use in relation to a chart.

Additionally, any other configuration could be used in relation to the prices surrounding the selected price, such as, for example, displaying only lower price levels, higher price levels, or yet displaying a combination of higher and lower price levels at some other locations than the locations shown in FIG. 4 and FIG. 5. Also, it should be understood that while each half 406 and 408 of the interface 404 displays eight price levels, fewer or more price levels could be displayed as well based on user's preferences or based on a hard-coded configuration. According to yet another example embodiment, a second ring with additional price levels could be displayed as well.

As explained earlier, the order entry interface 404 tracks the movement of a user input device. When a user moves a cursor thus moving the interface 404 in relation to the chart 402, the prices displayed via the interface 404 dynamically change based on the location of the cursor in relation to the chart 402. FIG. 4 illustrates a change in the displayed price levels as the interface 404 has been moved to a new location, as shown at 410A, with the interface now shown at 404A. As shown in relation to the interface 404A, the new location of the cursor corresponds to the price level of 608, with lower and higher price levels displayed below and above the reference object of each half of the interface 404A, respectively. Also, as shown in relation to the interface 404A, the location of the cursor does not correspond to any point on the chart 402. Regardless, the location of the cursor is mapped to a price level on the price axis.

According to one example embodiment, a user can freeze the prices displayed in relation to the order entry interface 404 to enter trade orders to buy or sell a tradeable object for which data is displayed via the chart 402. It should be understood that any predefined user input could freeze the prices. According to one example embodiment using a mouse as a user input device, a user freezes the prices displayed via the interface 404 by selecting and holding down one of the buttons of the mouse. Then, to enter an order, the user moves the cursor, with the mouse button depressed down, to an interface object corresponding to a desired price. According to the example embodiment described earlier where the left half 408 of the interface 404 is a bid side, and the right half 406 is an ask side, a user may move the cursor to a price level on the bid side 408 to place a buy order, and to a price level on the ask side 406 to place a sell order. In the embodiment where the button down action freezes the price levels displayed via the interface 404, a user could position the cursor at a desired price and release the pressed down button over an interface object corresponding to the desired price to place a trade order to buy or sell at the desired price. In such an embodiment, a user may cancel an order entry process by simply releasing the mouse button outside any interface object displayed via the interface 404. According to another example embodiment, a click-release mouse action could be first used in relation to a desired price level to freeze the interface 404, and then another click-release action could be used in relation to the desired price object to place an order.

Additionally, as new data is received for display in relation to the chart 402, the chart will be scrolling to the left to allow for display of new data points in relation to the chart 402. In one example embodiment, the interface 404 may scroll with the chart 402. To prevent any price changes displayed via the interface 404 at the time when a user initiates an order, a user input action initiated an order entry could freeze the price levels displayed via the interface 404 and may also prevent any automated chart rescaling for a time period until an initiated order action is completed or an order action is cancelled. Different embodiments where the auto-scrolling feature is disabled are possible as well.

It should be understood that different embodiments could also be used for order entry. For example, any predefined user action, such a selection of a specific key on a keyboard or a combination of keys may freeze price levels displayed via the interface 404. Then, once the prices displayed via the interface 404 freeze, a selection of a desired price level via one of the interface objects results in placing an order to buy or sell order.

Additionally, a user may preset a default order quantity to be used in relation to any order that is entered via the interface 404. Alternatively, a quantity interface could be displayed either in relation to the interface 404 so that a user could selectively choose a desired quantity, or the interface 404 could be designed to allow a user select a desired quantity, as shown in the next figure.

Figure 6:
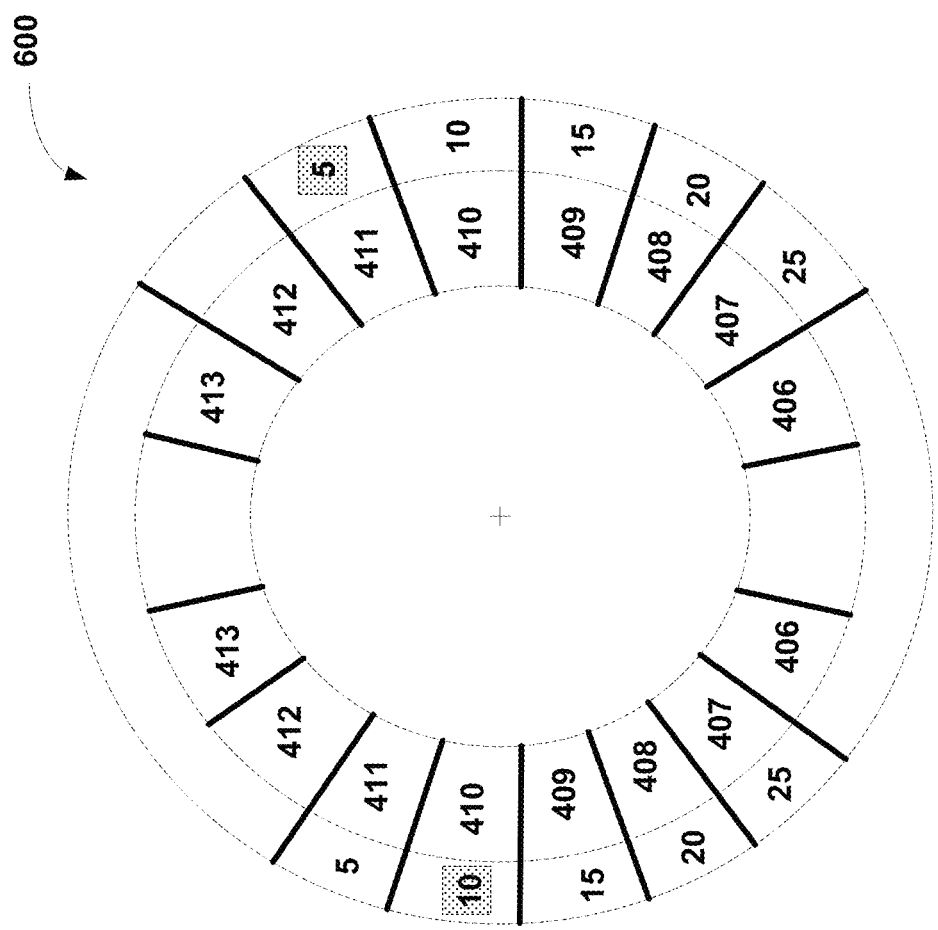
FIG. 6 is a block diagram illustrating an example order entry interface incorporating a quantity selection interface.

FIG. 6 is a block diagram illustrating an example order entry interface 600 incorporating a quantity selection interface. The interface 600 illustrates a number of interface objects corresponding to price levels as was shown and described in relation to FIG. 4. Additionally, the interface 600 includes a number of quantity selection objects positioned in the outer ring of the price objects corresponding to the bid and ask side of the interface 600. In the embodiment illustrated in FIG. 6, the quantity objects displayed on the bid side, here the left side, may be used to set quantity values for buy orders. Then, the quantity objects displayed on the ask side, here the right side, may be used to set a quantity for sell orders.

According to one example embodiment, a user can select a default quantity by simply clicking on a quantity object corresponding to the desired quantity before initiating an order entry process. As shown in FIG. 6, the highlighted quantity objects correspond to default quantities set for buy and sell orders, with a quantity of 10 set for buys and a quantity of 5 set for sells. According to one example embodiment, the quantity ring may rotate to align a default quantity with a current position of a cursor in relation to one of the price levels displayed via the interface. For example, if a cursor hovers over the price level of "408," the quantity ring rotates such that the quantity of "5" is aligned with the price level of "408." If the cursor is then moved to a price level of "406," the outer quantity ring may rotate again such that the quantity of "5" is aligned with the price level of "406."

It should be understood that while FIG. 6 illustrates five examples of buy and sell quantities, different quantities could also be used based on the user's preferences. For example, a user may select a quantity object to activate an interface that enables the user to change a quantity value for the selected quantity object or other quantity objects. Also, while the interface 600 displays a separate set of quantities for buy and sell orders, it should be understood that a common set of quantity objects may be used as well to set quantities for both buy or sell orders. Also, according to yet another example embodiment, only a single default quantity is displayed, or each price is assigned to its own quantity value that is displayed in relation to each price. Those skilled in the art will understand that many different embodiments are possible as well.

Figure 7:
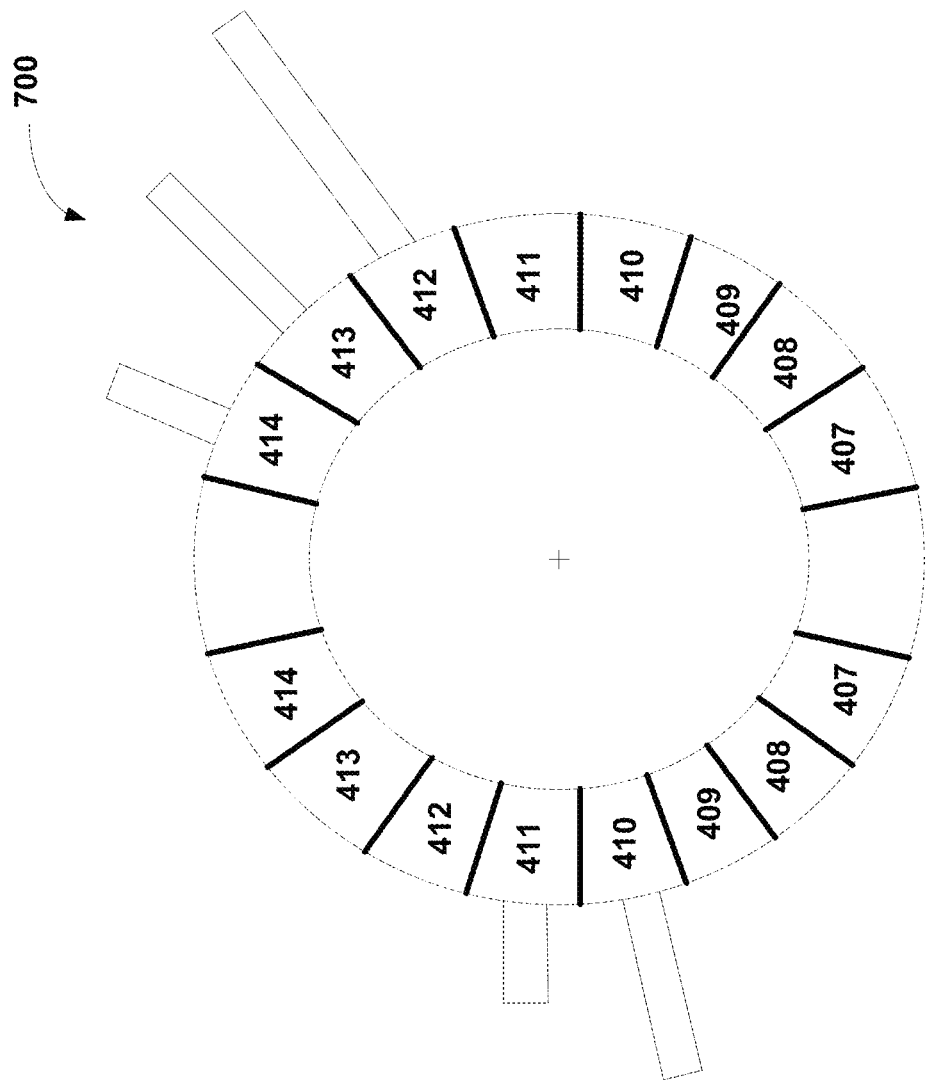
FIG. 7 is a block diagram illustrating an example order entry interface incorporating a view of market data corresponding to a tradeable object.

FIG. 7 is a block diagram illustrating yet another example order entry interface 600 that displays current market conditions at prices displayed via the interface 700.

According to one example embodiment, in addition to enabling a user to enter orders at desired price levels selected based on a position of a cursor in relation to a chart, the example order entry interface 700 also allows for viewing current market conditions in relation to the displayed prices. For example, as shown in FIG. 7, market depth data is graphically displayed in relation to some or all prices displayed via the interface 700 depending on the current market activity corresponding to the tradeable object in relation to one or more displayed price levels. According to one example embodiment, if one of the displayed price levels corresponds to the inside market, an indicator is used to alert a user of the current location of the inside market. For example, the price levels corresponding to the inside market could be highlighted; however, different indicators could also be used.

In the embodiment illustrated in FIG. 7, current market depth data are displayed in relation to each price using bars, where each bar represents a quantity pending at the price. It should be understood that the length of each bar may be scaled based on a predefined scale so that a user can easily view the relative quantity values pending at each price level. In addition to having the bars scaled, quantity values at market depth prices and inside market prices could be displayed in relation to each bar. It should be understood that depending on the position of the interface 700 in relation to a chart, if no quantities are available at a displayed price level, no bar would be displayed in relation to such price level. Also, quantity bars corresponding to bid prices are displayed in relation to prices on the bid side portion of the interface, here the left side, and quantity bars corresponding to ask prices are displayed in relation to prices on the ask side of the interface, here the right side. In the embodiment illustrated in FIG. 7, based on the position of the bars, a user can quickly determine that the current inside market is at price levels 411 and 412, with the best bid price at 411 and the best ask price at 412.

Figure 8:
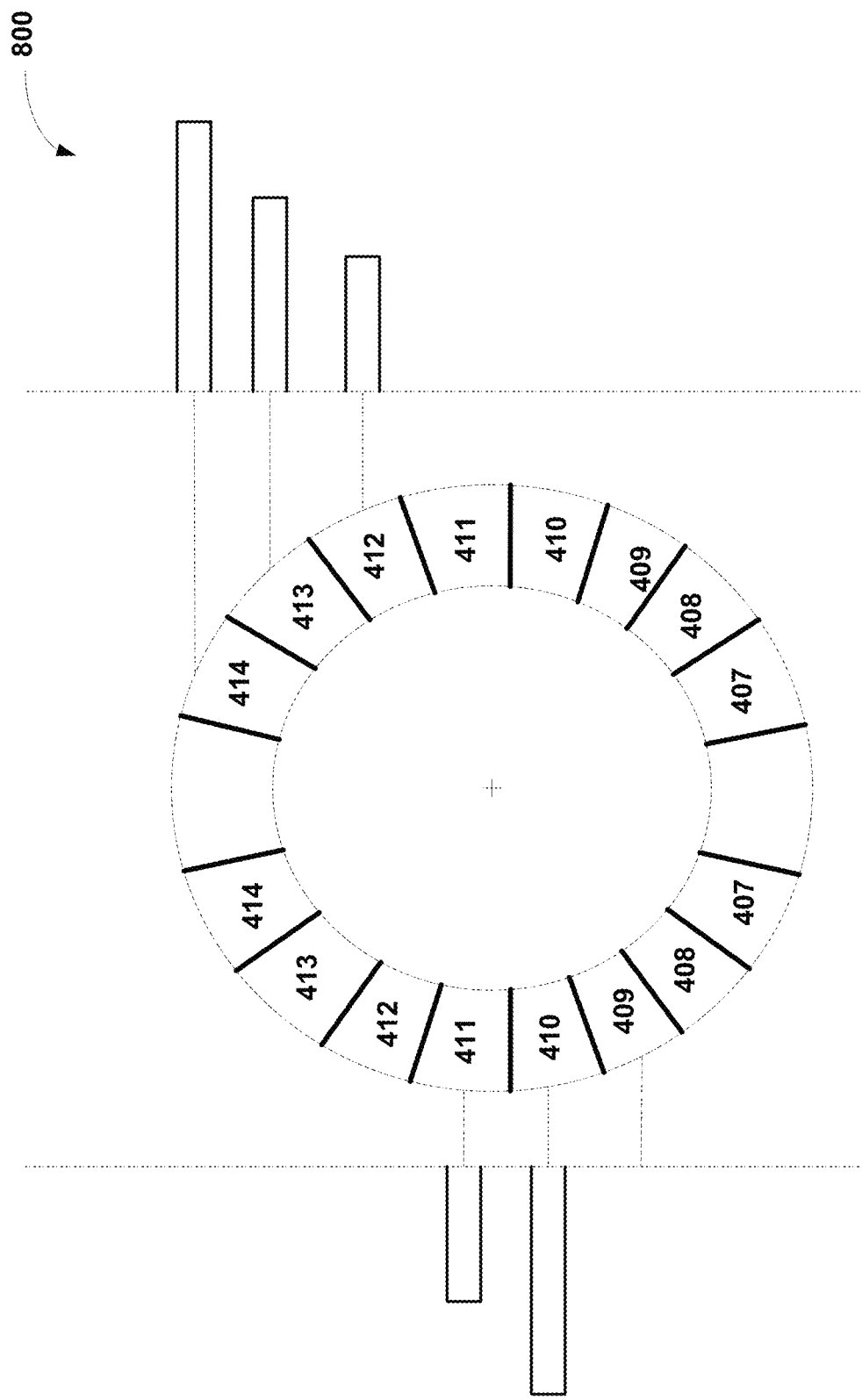
FIG. 8 is a block diagram illustrating yet another example order entry interface that displays current market conditions according to another arrangement.

It should be understood that the bars illustrated in FIG. 7 may not necessarily be radial with respect to each price object of the interface. FIG. 8 is a block diagram illustrating yet another example order entry interface 800 that displays current market conditions according to another arrangement. In the embodiment illustrated in FIG. 8, the market bars are aligned horizontally with the price objects displayed via the interface.

While FIG. 7 illustrates an embodiment related to displaying market data in relation the interface, it should be understood that different market related data, such as total traded volume at each price level could be displayed as well. Additionally, the example embodiments could also incorporate trader-related data. For example, when the interface 700 displays a price level at which a user has a pending working order, a working order indicator is displayed in relation to the price level. It should be understood that many different formats of working order indicators could be used including displaying an indicator directly next to a price in an interface object or having a separate ring with working order objects that display more detailed working order data. For example, according to the example embodiment where bid and ask prices are divided, any buy working order indicators could be displayed in relation to bid price objects, and ask working order indicators could be displayed directly next to ask price objects. Different embodiments are possible as well.

It will be apparent to those of ordinary skill in the art that the methods described above may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A method including:
    displaying by a computing device a movable order entry interface, wherein the movable order entry interface includes a plurality of price objects, wherein each price object corresponds to a price level, wherein the movable order entry interface is positioned at a location on a chart, wherein the chart includes historical market data corresponding to a tradeable object, wherein the historical market data is mapped to a plurality of values along a value axis;
    determining by the computing device a first plurality of price levels based on a value along the value axis associated with the location of the movable order entry interface with respect to the chart, wherein each price object of the plurality of price objects corresponds to one of the first plurality of price levels;
    displaying by the computing device, in response to an input signal from a user input device, the movable order entry interface at a new location on the chart in relation to an input location of the user input device;
    determining by the computing device, in response to the input signal from the user input device, a second plurality of price levels based on a new value along the value axis associated with the new location of the movable order entry interface with respect to the chart, wherein each price object of the plurality of price objects of the movable order entry interface is updated to correspond to one of the second plurality of price levels;
    receiving by the computing device a selection of a price object of the plurality of price objects by the user input device; and
    initiating by the computing device, in response to receiving the selection of the price object, placement of a trade order based on the price level corresponding to the selected price object.

2. The method of claim 1, wherein the plurality of price objects of the movable order entry interface is arranged in a circular shape.

3. The method of claim 1, wherein the plurality of price objects of the movable order entry interface is arranged in an arc shape.

4. The method of claim 3, wherein an angle corresponding to the arc shape is adjustable.

5. The method of claim 1, wherein the plurality of price objects of the movable order entry interface is arranged to form a pie-chart interface.

6. The method of claim 1, wherein the plurality of price objects of the movable order entry interface is arranged based on a user-defined shape.

7. The method of claim 1, wherein the plurality of price objects of the movable order entry interface includes a plurality of bid price objects and a plurality of ask price objects.

8. The method of claim 7, wherein the plurality of ask price objects correspond to different price levels than the plurality of bid price objects.

9. The method of claim 7, wherein the trade order is an order to buy when the selected price object is one of the plurality of bid price objects, wherein the trade order is an order to sell when the selected price object is one of the plurality of ask price objects.

10. The method of claim 1, wherein the movable order entry interface includes a plurality of quantity objects corresponding to a plurality of quantities.

11. The method of claim 10, further including:
receiving by the computing device a selection of a quantity object of the plurality of quantity objects, wherein the trade order is for a quantity corresponding to the selected quantity object.

12. The method of claim 1, further including:
receiving by the computing device a default quantity, wherein the trade order is for the default quantity.

13. The method of claim 1, wherein the selection of the price object by the user input device includes at least one of: a selection of a key on a keyboard, depressing a mouse button, releasing a mouse button, and a touch of a touchscreen display.

14. The method of claim 1, further including:
displaying by the computing device market data in relation to the plurality of price objects of the movable order entry interface.

15. The method of claim 14, wherein the market data includes current market depth for the price level corresponding to each of the plurality of price objects.

16. The method of claim 1, further including:
displaying by the computing device a working order indicator in relation to one of the plurality of price objects, wherein the working order indicator represents a working trade order at the price level corresponding to the one of the plurality of price objects.

17. The method of claim 1, further including:
displaying by the computing device traded volume in relation to at least one of the plurality of price objects.

18. The method of claim 1, further including:
updating by the computing device the historical market data as market data is received.

19. The method of claim 1, further including:
displaying by the computing device a current highest bid price available for trading the tradeable object in relation to the plurality of price objects.

20. The method of claim 1, further including:
displaying by the computing device a current lowest ask price available for trading the tradeable object in relation to the plurality of price objects.

* * * * *